US007122996B1

United States Patent

Huang

(10) Patent No.: US 7,122,996 B1
(45) Date of Patent: Oct. 17, 2006

(54) VOLTAGE REGULATOR CIRCUIT

(75) Inventor: Shengming Huang, Gourock (GB)

(73) Assignee: National Semiconductor Corporation, Santa Clara, CA (US)

( * ) Notice: Subject to any disclaimer, the term of this patent is extended or adjusted under 35 U.S.C. 154(b) by 199 days.

(21) Appl. No.: 10/858,875

(22) Filed: Jun. 1, 2004

(51) Int. Cl.
*G05F 1/40* (2006.01)
*G05F 1/56* (2006.01)
*H02H 7/10* (2006.01)

(52) U.S. Cl. ...................................... 323/288; 323/282

(58) Field of Classification Search ................ 323/268, 323/271, 275, 279–282, 285, 288
See application file for complete search history.

(56) References Cited

U.S. PATENT DOCUMENTS 6,157,176 A 12/2000 Pulvirenti et al.
6,388,433 B1 * 5/2002 Marty ........................ 323/284
6,518,737 B1 * 2/2003 Stanescu et al. ............ 323/280
6,600,692 B1 * 7/2003 Tanzawa ..................... 365/226
6,608,520 B1 * 8/2003 Miyazaki .................... 327/540
6,977,490 B1 * 12/2005 Zhang et al. ............... 323/280

OTHER PUBLICATIONS

National Semiconductor Corporation, "150mA Linear Voltage Regulator for Digital Applications", LP3990, Oct. 2004, pp. 1-13.

* cited by examiner

*Primary Examiner*—Matthew V. Nguyen
(74) *Attorney, Agent, or Firm*—Darby & Darby PC; Matthew M. Gaffney

(57) ABSTRACT

A voltage regulator circuit is arranged to provide a regulated output voltage from an unregulated input voltage. Also, the voltage regulator circuit includes a capacitor that is coupled between output and feedback nodes of the voltage regulator circuit. The capacitor may improve transient responses, output noise, and the power supply rejection ratio of the voltage regulator circuit during normal operation. During a start-up of the voltage regulator circuit, the capacitance between the output and feedback nodes is substantially eliminated or substantially reduced in order to reduce the time that it takes for the output voltage to reach a stable voltage level.

18 Claims, 3 Drawing Sheets

VOLTAGE REGULATOR CIRCUIT

FIELD OF THE INVENTION

The invention is related to voltage regulators, and in particular, to a voltage regulator circuit with a fast start-up, low and rapid load/line transient, low output noise, and a high power supply rejection ratio (PSRR).

BACKGROUND OF THE INVENTION

A voltage regulator circuit may be arranged to provide a regulated output voltage from an unregulated input voltage. Typically, the regulated output voltage is provided from the unregulated output voltage by a pass transistor that is driven by an error voltage. The error voltage is typically provided from an error amplifier based on a reference voltage and a feedback voltage. The feedback voltage is typically provided from the output voltage by a voltage divider.

BRIEF DESCRIPTION OF THE DRAWINGS

Non-limiting and non-exhaustive embodiments of the present invention are described with reference to the following drawings, in which.

DETAILED DESCRIPTION

Figure 1:
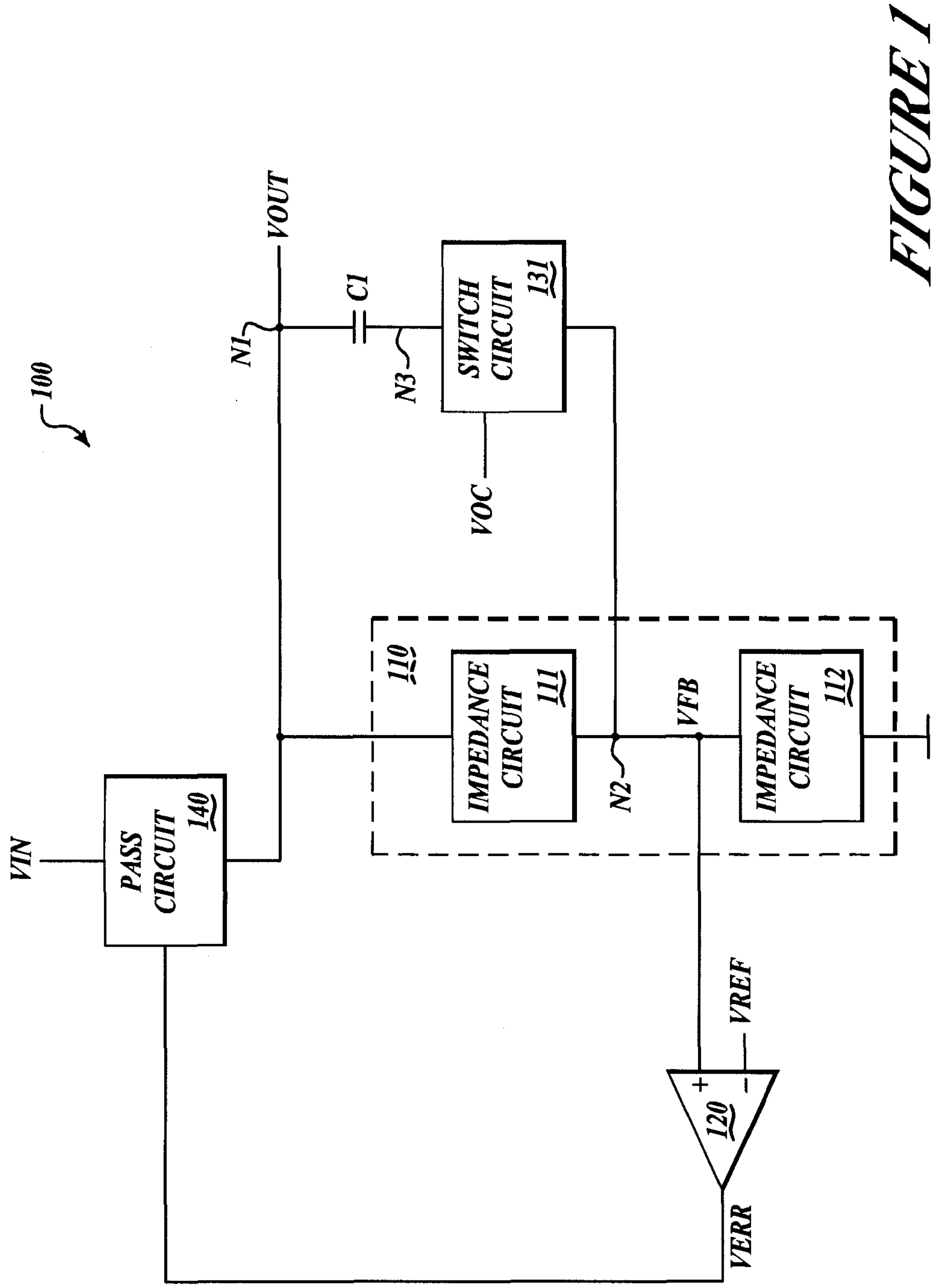
FIG. 1 illustrates block diagram of an embodiment of a voltage regulator circuit.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below are not intended to limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal.

Briefly stated, the invention is related to a voltage regulator circuit that is arranged to provide a regulated output voltage from an unregulated input voltage. The voltage regulator circuit includes a capacitor that is coupled between output and feedback nodes of the voltage regulator circuit.

The capacitor may improve transient responses, output noise, and the power supply rejection ratio (PSRR) of the voltage regulator circuit during normal operation. During a start-up of the voltage regulator circuit, the capacitance between the output and feedback nodes is substantially eliminated or substantially reduced in order to reduce the time that it takes for the output voltage to reach a stable voltage level.

FIG. 1 illustrates block diagram of an embodiment of voltage regulator circuit 100. Voltage regulator circuit 100 includes pass circuit 140, error amplifier circuit 120, switch circuit 131, capacitor circuit C1, and voltage divider circuit 110. Voltage divider circuit 110 includes impedance circuit 111 and impedance circuit 112.

Pass circuit 140 is arranged to provide regulated output voltage Vout at node N1 from unregulated input voltage VIN, responsive to error signal Verr. Voltage divider circuit 110 is arranged to provide feedback voltage Vfb at node N2 from signal Vout. Error amplifier circuit 120 is arranged to provide signal Verr from signal Vfb and voltage reference signal Vref. Although not shown, signal Vref may be provided by a reference voltage circuit.

Additionally, capacitor circuit C1 is coupled between nodes N1 and N3, and switch circuit 131 is coupled between node N3 and N2. Capacitor circuit C1 has an associated capacitance. Capacitor circuit C1 may be a single capacitor, or may include two or more capacitors that are arranged in series and/or in parallel to provide the capacitance that is associated with capacitor circuit C1. In one embodiment, the capacitance associated with capacitor circuit C1 is between 15 pF and 30 pF.

Also, switch circuit 131 is arranged to open and close responsive to signal Voc. If switch circuit 131 is closed, the capacitance between nodes N1 and N2 is based, in part, on the capacitance that is associated with capacitor circuit C1. If switch circuit 131 is open, the capacitance between nodes N1 and N2 is substantially unaffected by capacitor circuit C1. In one embodiment, signal Voc is controlled such that switch circuit 131 is closed during normal operation, and open during a start-up of voltage regulator circuit 100.

During normal operation, the capacitance that is associated with capacitor circuit C1 may improve the transient performance of voltage regulator circuit 100. In particular, load/line transient responses, output noise, and PSRR of voltage regulator circuit 100 may be substantially improved by capacitor circuit C1 during normal operation.

During the start-up of voltage regulator circuit 100, switch circuit 131 may be open. Accordingly, the capacitance between nodes N1 and N2 is substantially reduced or substantially eliminated. This may reduce the time that it takes for signal Vout to reach a stable voltage level.

Figure 2:
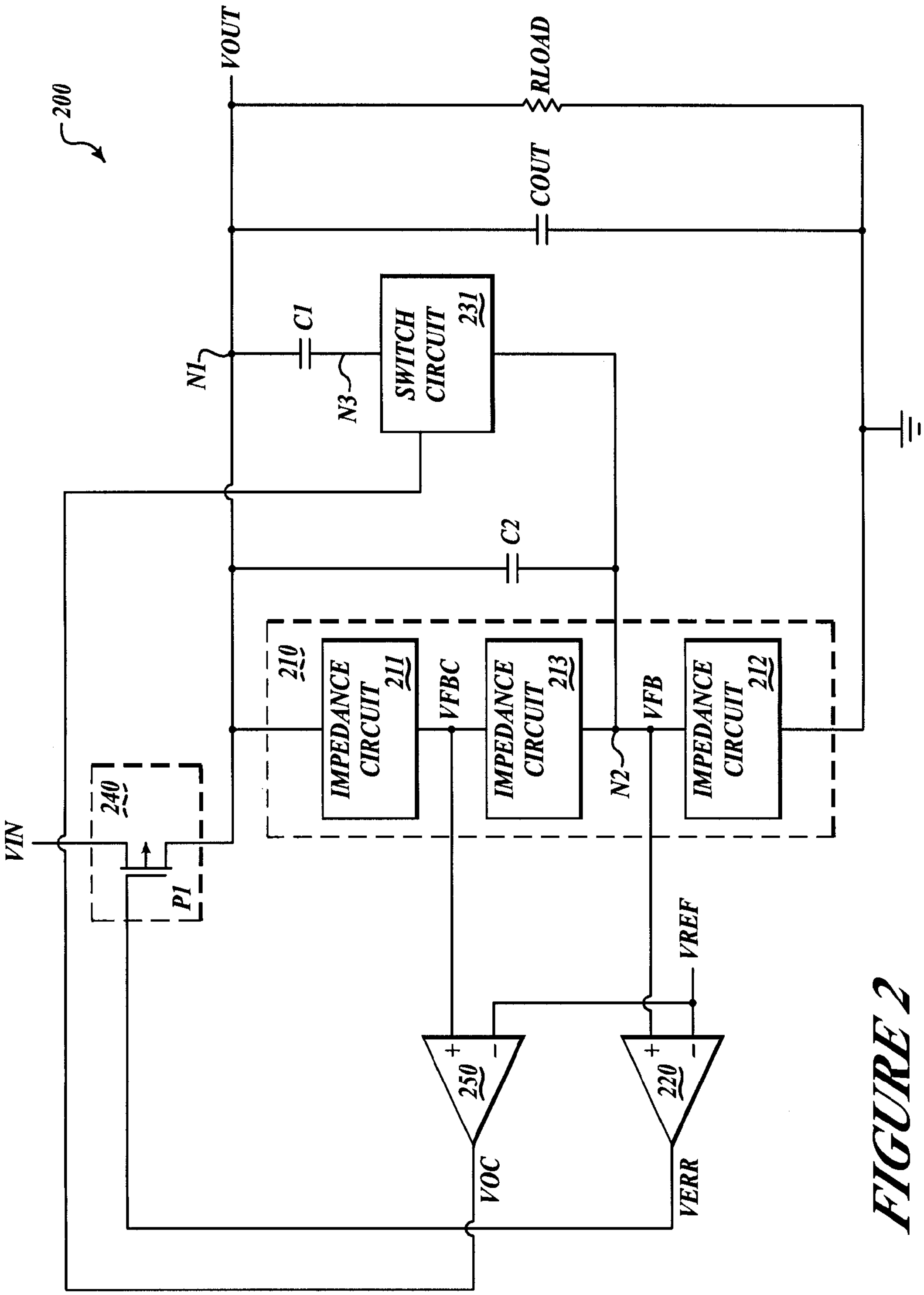
FIG. 2 shows a block diagram of an embodiment of the voltage regulator circuit of FIG. 1 that includes a comparator circuit for controlling a switch circuit of FIG. 1.

FIG. 2 shows a block diagram of an embodiment of voltage regulator circuit 200, which includes a comparator circuit for controlling a switch circuit of voltage regulator circuit 200. Components in voltage regulator circuit 200 may operate in a similar manner to similarly-named components in voltage regulator circuit 100, and may operate in a different manner in some ways. Voltage regulator circuit 200 further includes comparator circuit 250. Optionally, voltage regulator circuit 200 may also include capacitor circuit C2. Voltage divider circuit 210 further includes impedance circuit 213. Pass circuit 240 includes transistor PM1.

Impedance circuit 213 is arranged to provide another feedback signal Vfbc. Impedance circuit 213 has an associated impedance which is small compared to impedances that are associated with impedance circuits 211 and 212.

Accordingly, the voltage of signal Vfbc is close to, but slightly greater than, the voltage of signal Vfb.

Additionally, comparator circuit 250 is arranged to provided signal Voc from signals Vfbc and signal Vref. During normal operation, the voltage of signal Vfb is substantially equal to the voltage of signal Vref. Accordingly, during normal operation, the voltage of signal Vfbc is greater than the voltage of signal Vref.

Conversely, during the start-up, signals Vout, Vfb, and Vfbc may each be less than signal Vref. Signal Vout increases at a rate that may be based on Rload, Cout, the turn-on speed of transistor PM1, and the capacitance between nodes N1 and N2. Signals Vout, Vfb, and Vfbc may increase until signal Vfb is substantially equal to signal Vref. At that point, signal Vout may reach a stable value, and voltage regulator circuit 200 may begin normal operation.

As described above, during the start-up, signal Vfbc may be less than signal Vref. Accordingly, during the start-up, comparator circuit 250 may provide signal Voc as a logic low, which causes switch circuit 231 to be open. When signal Vfb reaches signal Vref, comparator circuit 250 may provide signal Voc as a logic high, which causes switch circuit 231 to be closed. Switch circuit 231 remains closed during normal operation.

If capacitor circuit C2 is not included in regulator circuit 200, the capacitance between nodes N1 and N2 may be substantially equal to C1. If capacitor circuit C2 is included in regulator circuit 200, the capacitance between nodes N1 and N2 may be substantially equal to C1+C2 during normal operation.

If capacitor circuit C2 is not included in regulator circuit 200, the capacitance between nodes N1 and N2 may be substantially equal to zero during the start-up. If capacitor circuit C2 is included in regulator circuit 200, the capacitance between nodes N1 and N2 may be substantially equal to C2 during the start-up. If capacitor circuit C2 is included in regulator circuit 200, C2 is small compared to C1.

In one embodiment, C1 is 25 pF, and capacitor circuit C2 is not included in regulator circuit 200. In this embodiment, the capacitance between nodes N1 and N2 is substantially zero during the start-up, and is approximately 25 pF during normal operation.

In another embodiment, C1 is 24 pF, and C2 is approximately 1 pF. In this embodiment, the capacitance between nodes N1 and N2 is approximately 1 pF during the start-up, and is approximately 25 pF during normal operation.

Figure 3:
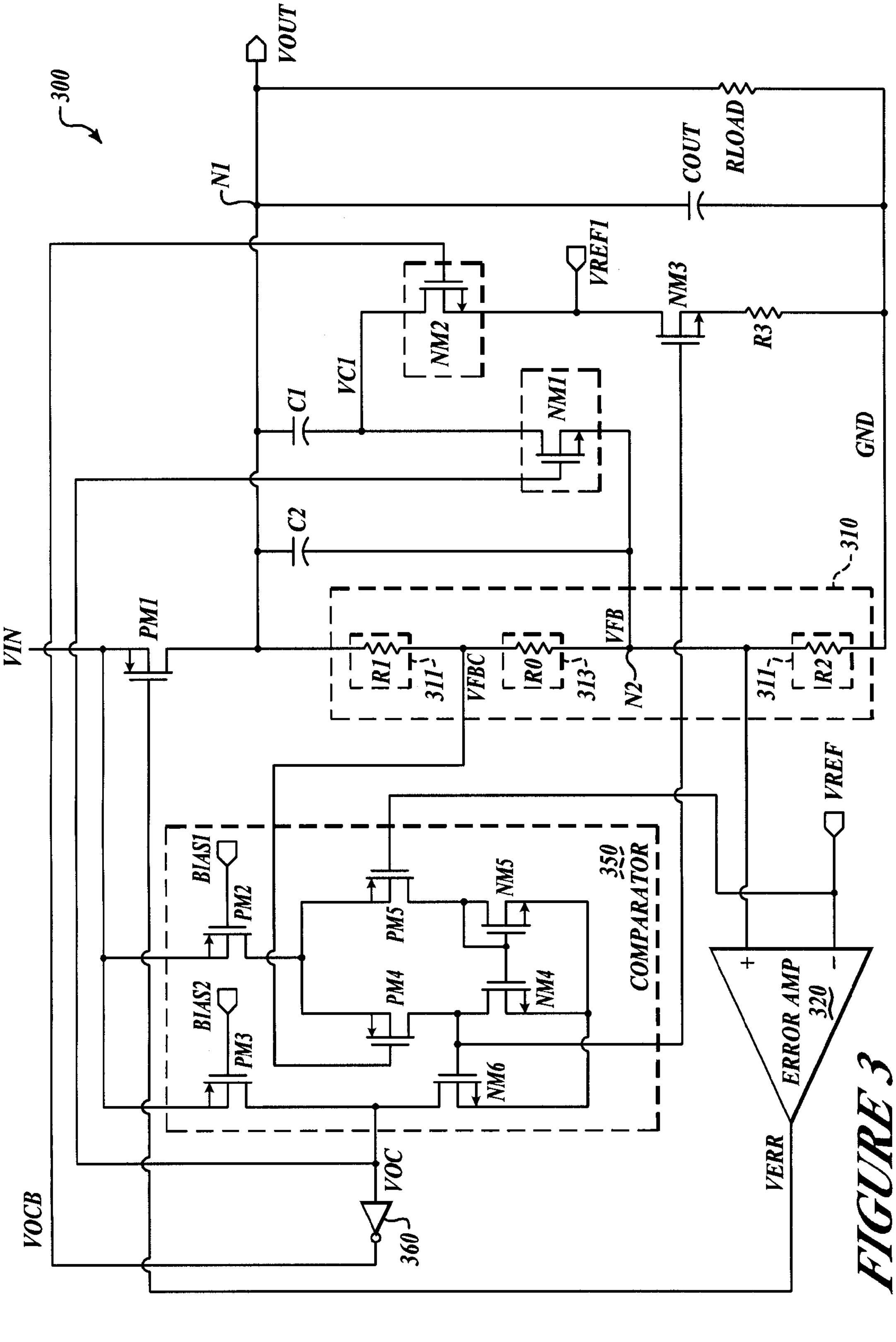
FIG. 3 schematically illustrates an embodiment of the voltage regulator circuit of FIG. 2, in accordance with aspects of the invention.

FIG. 3 schematically illustrates an embodiment of voltage regulator circuit 300. Components in voltage regulator circuit 300 may operate in a similar manner to similarly-named components in voltage regulator circuit 200, and may operate in a different manner in some ways. Voltage regulator circuit 300 further includes switch circuit 332, inverter 360, transistor NM3, and resistor R3. Impedance circuit 311 includes resistor R1. Impedance circuit 312 includes resistor R2. Impedance circuit 313 includes resistor R0. Switch circuit 331 includes transistor NM1. Switch circuit 332 includes transistor NM2. Comparator circuit 350 includes transistors NM4–NM6 and PM2–PM5.

In one embodiment, regulator circuit 300 is arranged to provide a 3.3V output voltage for signal Vout during normal operation, and to employ a 500 mV voltage for signal Vref. In other embodiments, others voltage levels may be employed.

Under stable conditions, output voltage Vout may be given by Vout=(1+[R0+R1]/R2)*Vref. Combined parallel capacitance C1+C2 is preferably relatively large, but not so large that output oscillation occurs. In one embodiment, C1+C2 is 25 pF. Capacitance CN12 will be used to represent the capacitance between nodes N1 and N2. Combined parallel capacitance C1+C2 is used as CN12 during normal operation to improve transient and AC responses such as PSRR, output noise, and load/line transient.

Ignoring the effects of CN12, during start-up, the transient voltage of signal Vfb is given by Vfb=Vout_t*R2/(R0+R1+R2), where Vout_t represents transient value of output voltage Vout during start-up in this equation. Vfb is lower than Vref before Vout is stable. Hence Vout_t rises until Vout_t substantially reaches (1+[R0+R1]/R2)*Vref. There is also a start-up time period for Vref to rise, but the turn-on speed of transistor PM1 is typically sufficient fast that the rising rate of Vout is primarily based on the start-up of signal Vref in this case.

However, because of the effect of CN12, Vfb follows Vout rapidly when Vout rises during start-up, leading to Vfb>Vout_t*R2/(R0+R1+R2) at this time. Therefore Vfb will be higher than Vref for a period of time after Vout_t goes over Vref during start-up, forcing the rising rate of Vout_t to slow down.

The current following through resistor R1 is t*IT/[(R1+R0)*CN12] at time t, where IT is the current following through CN12 during start-up, and current IT is primarily based on R2, CN12, Cout, Rload, and the conducting current of transistor PM1. Therefore the voltage drop across R2 is given by Vfb=R2*IT*{1+t/[(R1+R0)*CN12]}. After t=Td, the condition of Vfb=R2*IT*{1+Td/[(R1+R0)*CN12]}=Vout_t*R2/(R0+R1+R2) can be met during start-up. Accordingly, CN12 induced time delay may be expressed as Td=(R1+R0)*CN12*[Vout_t–(R0+R1+R2)*IT]/[(R0+R1+R2)*IT]. Accordingly, the time delay induced by CN12 is proportional to CN12 and it also increases with high Vout_t.

In circuit 300, CN12 is dynamically controlled such that CN12 is relatively small during start-up and relatively large after start-up. CN12 is substantially given by C1+C2 during normal operation. However, switch circuit 331 is arranged such that, during start-up, CN12 is C2 rather than C1+C2. Preferably, C1 is substantially greater than C2. When signal Voc is low, transistor NM1 is off, so that the resistance between nodes N2 and N3 is sufficiently high as to be approximately an open circuit. When signal Voc is high, transistor NM1 is on, so that the resistance between nodes N2 and N3 is sufficiently low that nodes N2 and N3 are approximately shorted together.

R0 is relatively small compared to R1 and R2. In one embodiment, R1 is 1535 kiloohms, R2 is 275 kiloohms, and R0 is 5 kiloohms, so that Vfbc is only about 9 mV greater than Vfb. Since C2 is relatively small, Vfb is almost equal to Vout_t*R2/(R1+R0+R2), and both Vfb and Vfbc are lower than Vref during start-up. In this case, signal Voc is low and capacitor circuit C1 is disconnected. Because C2 is relatively small (e.g. 1 pF), the influence of C2 on the rising rate of Vout_t is insignificant. In this case, the rising rate of Vout_t is mainly dependent on the start-up of Vref.

Comparator circuit 350 is arranged to dynamically control the connection of capacitor circuit C1. If Vout_t increases too fast, Vfbc will be higher than Vref and capacitor circuit C1 will be connected, forcing Vout_t to rise a little bit slower. After signal Vout is stable, Vfb=Vref and Vfbc>Vref, and comparator circuit 350 changes the logic level of Voc.

Switch circuit 332 is arranged such that the connection process of capacitor circuit C1 via switch circuit 331 to node N2 is smooth. If potential Vc1 at node N3 is not controlled when switch circuit 331 is off, Vc1=Vout. If switch circuit 331 turns on, Vc1 charges Vfb through switch circuit 331, resulting in a transient increase of Vfb, which can be higher than Vref transiently. This in turn leads to a transient drop of Vout. If Vc1 is controlled to be significant lower than Vref during the off-state of switch circuit 331, Vfb will charge Vc1 once switch circuit 331 turns on, leading to a transient rise of Vout. Therefore Vc1 must be controlled at around the same level as Vref at various temperatures when switch circuit 331 is in off-state. Switch circuit 332, transistor NM3, resistor R3 and voltage reference Vref1 are employed for this purpose. Voltage Vref1 may be provided by another voltage reference circuit (not shown) and is substantially equal to Vref.

The gate of transistor NM2 is arranged to receive signal Vocb. Inverter 360 is arranged to provide signal Vocb from signal Voc. The source of transistor NM2 is coupled to Vref1 and the drain of NM3. The gate of transistor NM3 is coupled to the output of the first stage of comparator circuit 350, such that its on-resistance is controlled by a signal that is provided by the first stage of comparator circuit 350, The signal provided by the first stage of comparator circuit 350 is related to signal Vout. The source of NM3 is coupled to ground via resistor R3. During start-up, when Vfbc is lower than Vref, transistors NM2 and NM3 are in on-state and switch circuit 331 is in the off-state. To substantially prevent current from flowing into or out of the other voltage reference circuit (which provides signal Vref1), transistor NM3 is arranged such that the current flowing through transistor NM3 is substantially equal to the transient current of capacitor circuit C1 induced by the transient rise of signal Vout and Vc1. The average current flowing through capacitor circuit C1 before switch circuit 331 closes is substantially given by C1*(Vout−Vref1)/Δt, where Δt is the start-up time. During normal operation, both NM2 and NM3 are off.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A voltage regulator circuit, comprising:

a pass transistor that is coupled to an output node;

a voltage divider circuit that includes first, second, and third impedance circuits, wherein the third impedance circuit is coupled between a first feedback node and a second feedback node, the first impedance circuit is coupled between the output node and the second feedback node, and wherein the second impedance circuit is coupled to the first feedback node;

an error amplifier circuit including a first input that is coupled to the first feedback node, a second input, and an output that is coupled to the pass transistor;

a capacitor circuit that is coupled between the output node and a capacitor node;

a comparator circuit including a first input that is coupled to the second feedback node, a second input that is coupled to the second input of the error amplifier circuit, and an output; and a switch circuit that is coupled between the capacitor node and the first feedback node, and further coupled to the output of the comparator circuit.

2. The circuit of claim 1, wherein the first, second, and third impedance circuits each comprise a resistor.

3. The circuit of claim 1, wherein the comparator circuit is arranged to provide a comparison output signal at the output of the comparator circuit, and wherein the switch circuit is arranged to change a resistance between the capacitor node and the first feedback node in response to the comparison output signal.

4. The circuit of claim 1, furthering comprising another capacitor circuit that is coupled between the output node and the first feedback node.

5. The circuit of claim 4, wherein the capacitor circuit has a capacitance, the other capacitor circuit has another capacitance that is significantly less than the capacitance of the capacitor circuit, and wherein a combined parallel capacitance of the capacitor circuit and the other capacitor circuit is approximately 20 picoFarads to 30 picoFarads.

6. The circuit of claim 1, further comprising a reference voltage circuit that is coupled to the second input of the error amplifier circuit.

7. The circuit of claim 6, further comprising:

another reference voltage circuit; and another switch circuit that is coupled between the capacitor node and the reference voltage circuit, and further coupled to the output of the comparator circuit.

8. The circuit of claim 7, further comprising an inverter that is coupled between the output of the comparator circuit and the other switch circuit.

9. The circuit of claim 7, further comprising a transistor that is coupled between the reference voltage circuit and the second impedance circuit, and further coupled to the comparator circuit.

10. A voltage regulator circuit, comprising:

a pass circuit that is arranged to provide a regulated output voltage at an output node from an unregulated input voltage, responsive to an error signal;

a voltage divider circuit that is arranged to provide a first feedback signal at a feedback node based on the regulated output voltage;

an error amplifier circuit that is arranged to provide the error signal based on a reference signal and the first feedback signal;

a first capacitor circuit that is coupled between the output node and the feedback node; and a switch circuit that is arranged to substantially decrease a capacitance between the output node and the feedback node during a start-up.

11. The circuit of claim 10, wherein, during the start-up, the switch circuit is arranged to decrease the capacitance between the output node and the feedback node to one of approximately zero and approximately one picoFarad.

12. The circuit of claim 10, wherein the capacitor circuit has an associated capacitance of approximately 15 to 30 picoFarads.

13. The circuit of claim 10, further comprising a comparator circuit that is arranged to provide a comparison output signal in response to a comparison of the reference signal and a second feedback signal, wherein the second feedback signal is provided from the first feedback signal, a second feedback voltage associated with the second feedback signal is greater than a first feedback voltage that is associated with the first feedback signal, and wherein the switch circuit is arranged to open and close responsive to the comparison output signal.

14. The circuit of claim 13, wherein the voltage divider circuit includes a first resistor circuit and a second resistor circuit, wherein the first resistor circuit is coupled between an output node and the feedback node, and wherein the second resistor circuit is coupled to the feedback node, wherein the pass circuit is arranged to provide the regulated output voltage at the output node.

15. The circuit of claim 14, wherein the voltage divider circuit further includes a third resistor circuit that is coupled between the first resistor circuit and the feedback node, such that the first and third resistor circuits are coupled together at a second feedback node; and wherein the voltage divider circuit is further arranged to provide the second feedback signal at the second feedback node.

16. The circuit of claim 10, wherein the first capacitor circuit is coupled between the output node and a capacitor node, and wherein the switch circuit is coupled between the capacitor node and the feedback node.

17. The circuit of claim 16, further including another switch circuit that is coupled between another reference signal and the capacitor node, wherein the other switch circuit is responsive to a signal that is based on the comparison output signal, and wherein the other reference signal has an associated voltage that is substantially the same as a voltage that is associated with the reference signal.

18. A voltage regulator circuit, comprising:

means for providing a regulated output voltage at an output node from an unregulated input voltage;

means for providing a first feedback signal at a feedback node based on the regulated output voltage;

means for providing a capacitance between the output node and the feedback node; and means for substantially decreasing the capacitance during a start-up.

* * * * *